No. 852,605.  
PATENTED MAY 7, 1907.

M. HARDMAN.  
HAY LOADER.  
APPLICATION FILED MAY 26, 1906.

WITNESSES:  
E. W. Stewart  
Herbert D. Lawson

Mark Hardman, INVENTOR  
By C. A. Snow & Co.  
ATTORNEYS

UNITED STATES PATENT OFFICE.

MARK HARDMAN, OF AFTON, WYOMING.

HAY-LOADER.

No. 852,605.  Specification of Letters Patent.  Patented May 7, 1907.

Application filed May 26, 1906. Serial No. 318,967.

*To all whom it may concern:*

Be it known that I, MARK HARDMAN, a citizen of the United States, residing at Afton, in the county of Uinta and State of Wyoming, have invented a new and useful Hay-Loader, of which the following is a specification.

This invention relates to machines for gathering and hauling hay and its object is to provide a device of this character which is of simple construction and which can be readily drawn over a field and gather hay and deposit it upon a platform movable with the gathering mechanism.

A still further object is to provide novel mechanism for adjusting the gathering mechanism to desired distances from the ground and also to provide mechanism for swinging the gathering mechanism so as to direct the hay on to the platform.

With the above and other objects in view the invention consists of a platform having guard rails secured to the side and rear ends thereof and this platform is supported by side wheels and at each side of the platform is provided means whereby draft animals can be readily connected to the machine for the purpose of pulling it forward. A vertically adjustable caster is disposed at the rear end of the platform adjacent a seat provided for the operator and mechanism is employed whereby this caster may be adjusted so as to raise or lower the rear end of the platform. A series of fingers is pivotally mounted at the front end of the platform and is provided with means whereby the fingers can be raised or lowered.

The invention also consists of certain other novel features of construction and combinations of parts which will be hereinafter more fully described and pointed out in the claims.

In the accompanying drawings is shown the preferred form of the invention.

Figure 1:
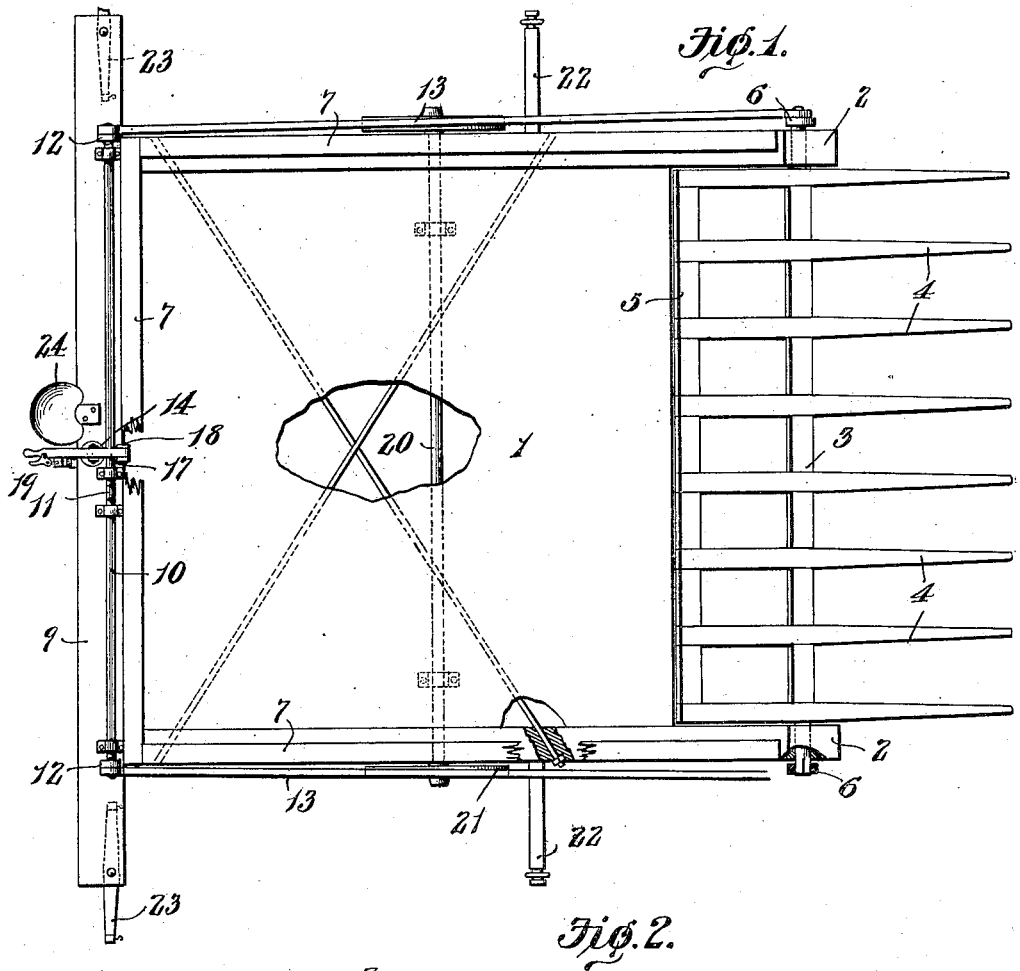
Figure 2:
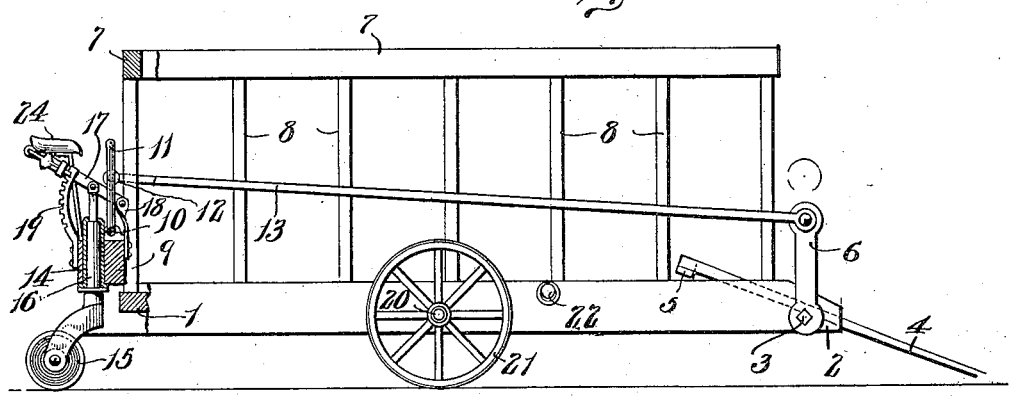

In said drawings: Figure 1 is a plan view of the complete machine portions thereof being broken away; and Fig. 2 is a view partly in side elevation and partly in section.

Referring to the figures by characters of reference, 1 is a platform of suitable proportions having arms 2 extending forward from its sides and constituting bearings for the end of a cross bar 3 to which are secured a series of parallel gathering fingers 4 projecting beyond the platform and of any desired proportions. The rear ends of these fingers are connected by a bar 5, and arms 6 extend upward from and are movable with the series of fingers. Rear and side rails 7 are supported upon the platform by uprights 8 and a cross beam 9 is fastened to the uprights at the rear of the platform and projects beyond the sides of said platform. A shaft 10 is rotatably mounted on this beam 9 and has an operating lever 11 connected to it adjacent its center while the ends of the shaft are provided with cranks 12 connected by means of rods 13 to the arms 6 before referred to.

A tubular guide 14 is suitably connected to the center of the cross beam 9 and bears at its lower end upon a caster 15 the stem 16 on said caster projecting through the tubular guide. An operating lever 17 is connected to the upper end of this stem and to the standards 18 and is provided with any suitable means such as a rack 19 whereby it can be locked in any position to which it may be adjusted.

An axle 20 extends under, and through the sides of, the platform and loosely mounted on the ends thereof are supporting wheels 21. Laterally extending arms 22 project from the sides of the platform in front of the wheels 21 and constitute neck yokes for the draft animals. Trees 23 are adapted to be connected to the ends of the beam 9. A driver's seat 24 is supported by the cross beam 9 close to the levers 11 and 17 and the weight of the driver and that portion of the machine in rear of the wheels is sufficient to overbalance the front portion of the machine at all times during its operation.

In using the machine the draft animals are connected to the ends of the cross beam 9 and to the arms 22 and are then driven forward so as to pull the machine between them. By properly manipulating the lever 17 the rear end of the platform can be raised or lowered as desired and by manipulating the lever 11 the operator can swing the series of gathering fingers into any desired relation to the ground. As the machine comes forward these fingers will collect the hay which will slide upward on to the platform. If desired the fingers with the hay thereon can be swung upward so as to throw the hay backward on to the platform. A large amount of material can be carried by the platform because of the side rails provided.

The preferred form of the invention has been set forth in the foregoing description but I do not limit myself thereto as I am aware that modifications may be made therein without departing from the spirit or sacrificing the advantages and I therefore reserve the right to make such changes as fairly fall within the scope of the invention.

What is claimed is:

1. In a machine of the character described, the combination with a portable platform; of arms fixed in relation to and extending forward from the platform, a series of fingers hung between the arms and disposed at all times entirely in front of the platform, and means for swinging the fingers in unison.

2. In a machine of the character described, the combination with a portable platform; of arms fixed in relation to and extending rigidly from the front end of the platform, said arms being continuations of the sides of the platform, a series of gathering fingers mounted to swing between the arms, and means for swinging said fingers in unison to the desired angles in relation to the platform.

3. In a machine of the character described, the combination with a portable platform pivotally supported adjacent its center, and means for swinging the platform upon its support; of arms fixed in relation to and extending forward from the sides of the platform, a plurality of gathering fingers hung between the arms and entirely in front of the platform, and means for swinging the fingers in unison to a desired angle in relation to the platform.

4. In a machine of the character described, the combination with a portable platform pivotally supported between its ends, and means for swinging the platform upon its support to adjust its angle to the horizontal; of arms rigidly connected to and extending forward from the platform; a rotatable cross-bar journaled at its ends within the fixed arms, a plurality of gathering fingers rigidly secured to and movable with the cross-bar, said fingers being disposed entirely in front of the platform, an arm extending from the cross-bar, and means for swinging said arm to adjust the fingers to a desired angle to the platform.

In testimony that I claim the foregoing as my own, I have hereto affixed my signature in the presence of two witnesses:

MARK HARDMAN

Witnesses:
EDMOND A. STEPHENS,
JOHN HARDMAN.